US010833757B1

(12) United States Patent
Dana et al.

(10) Patent No.: US 10,833,757 B1
(45) Date of Patent: Nov. 10, 2020

(54) SYSTEMS AND METHODS FOR MITIGATING ADJACENT SATELLITE INTERFERENCE

(71) Applicant: Rockwell Collins, Inc., Cedar Rapids, IA (US)

(72) Inventors: Roger A. Dana, Marion, IA (US); Lee M. Paulsen, Cedar Rapids, IA (US); Nahiyan Ali, Des Plaines, IL (US); Connor C. McBryde, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/593,876

(22) Filed: Oct. 4, 2019

Related U.S. Application Data

(63) Continuation of application No. 15/996,223, filed on Jun. 1, 2018, now Pat. No. 10,439,707.

(51) Int. Cl.
*H04B 1/00* (2006.01)
*H04B 7/185* (2006.01)
*H04B 17/345* (2015.01)

(52) U.S. Cl.
CPC ....... *H04B 7/18513* (2013.01); *H04B 17/345* (2015.01)

(58) Field of Classification Search
CPC .......................... H04B 7/18513; H04B 17/345
USPC ....................................................... 455/63.1
See application file for complete search history.

(56) References Cited

U.S. PATENT DOCUMENTS

| 6,404,404 | B1 * | 6/2002 | Chen ................. | H01Q 21/0025 343/844 |
| 8,346,162 | B1 * | 1/2013 | Jayasimha ......... | H04B 7/18521 455/12.1 |
| 8,963,774 | B1 * | 2/2015 | Livadaru ............ | H01Q 9/32 342/374 |
| 9,337,536 | B1 * | 5/2016 | Paulsen ............. | H01Q 1/1257 |
| 9,711,866 | B1 * | 7/2017 | Doane .............. | H01Q 15/14 |
| 10,211,510 | B1 * | 2/2019 | Paulsen ............. | H01Q 3/2611 |

(Continued)

OTHER PUBLICATIONS

Elliott, R.S., "Design of Line Source Antennas for Narrow Beamwidth and Asymmetric Low Sidelobes", IEEE Transactions on Antennas and Propagation, Jan. 1975. (8 pages).

(Continued)

*Primary Examiner* — Ankur Jain
*Assistant Examiner* — Max Mathew
(74) *Attorney, Agent, or Firm* — Suiter Swantz pc llo

(57) ABSTRACT

Systems and methods of mitigating signal interference in communications involving an antenna array can include determining a radiation pattern of the antenna array in communication with a first communication device. The method can include determining that a power level or gain of the antenna array in a direction pointing to a second communication device exceeds a predefined threshold value, using the radiation pattern of the antenna array and a position of the second communication device. The method can include identifying one or more antenna elements among a plurality of antenna elements of the antenna array to be powered off or applying non-uniform weighting to the antenna elements to distort the radiation pattern of the antenna array in a way to reduce the power level or gain of the antenna array in the direction pointing to the second communication device.

20 Claims, 10 Drawing Sheets

(56) References Cited

U.S. PATENT DOCUMENTS

| | | | | |
|---|---|---|---|---|
| 10,277,308 B1* | 4/2019 | Cross | ............... | H04B 7/1851 |
| 2006/0033659 A1* | 2/2006 | Strickland | ............ | H01Q 3/26 |
| | | | | 342/372 |
| 2008/0291864 A1* | 11/2008 | Chang | ............. | H04B 7/1851 |
| | | | | 370/316 |
| 2011/0269396 A1* | 11/2011 | Beeler | ............ | H04B 7/18543 |
| | | | | 455/9 |
| 2013/0035052 A1* | 2/2013 | Musselman | ....... | H01Q 21/065 |
| | | | | 455/278.1 |
| 2013/0182790 A1* | 7/2013 | Jalali | ............. | H04B 7/18508 |
| | | | | 375/285 |
| 2014/0145887 A1* | 5/2014 | Irvine | ................. | H01Q 3/26 |
| | | | | 343/713 |
| 2017/0054223 A1* | 2/2017 | Gallagher | ............ | H01Q 1/38 |
| 2017/0254905 A1* | 9/2017 | Reis | ..................... | H04L 1/00 |
| 2017/0338556 A1* | 11/2017 | Yi | ..................... | H01Q 15/167 |
| 2017/0353864 A1* | 12/2017 | Bull | ................... | H04W 16/14 |
| 2017/0358851 A1* | 12/2017 | Diamond | ............. | H01Q 3/02 |
| 2018/0103381 A1* | 4/2018 | Ramamurthi | ...... | H04W 36/20 |
| 2018/0191406 A1* | 7/2018 | Jackson | ............ | H01Q 21/22 |
| 2019/0007129 A1* | 1/2019 | Vargas | ............. | H04W 24/04 |
| 2019/0109633 A1* | 4/2019 | Williams | .......... | H04W 16/24 |
| 2019/0349074 A1* | 11/2019 | Petranovich | ...... | H04B 7/18515 |

OTHER PUBLICATIONS

Notice of Allowance for U.S. Appl. No. 15/996,223 dated Jun. 5, 2019. 16 pages.

Taylor, T.T., "Design of Line-Source Antennas for Narrow Beamwidth and Low Side Lobes", I-R-E Transactions-Antennas and Propagation, Jan. ed., 1955. (13 pages).

* cited by examiner

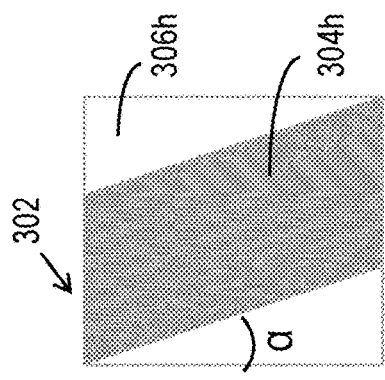
(h) Left Leaning Parallelogram
α = 20°
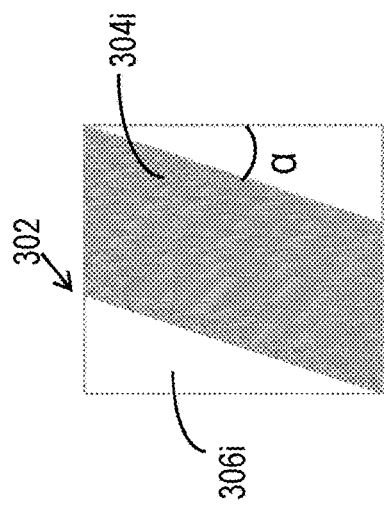
(i) Right Leaning Parallelogram
α = 20°
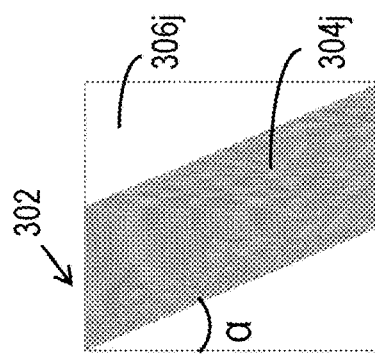
(j) Left Leaning Parallelogram
α = 25°
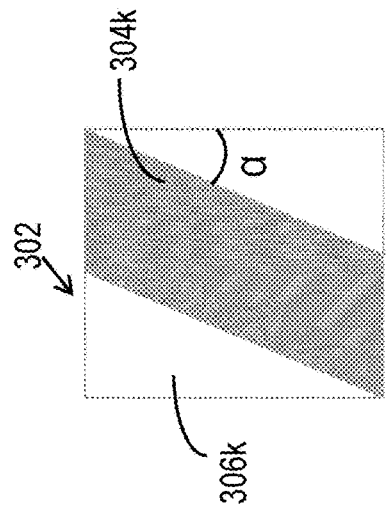
(k) Right Leaning Parallelogram
α = 25°
FIG. 3 (Continued)

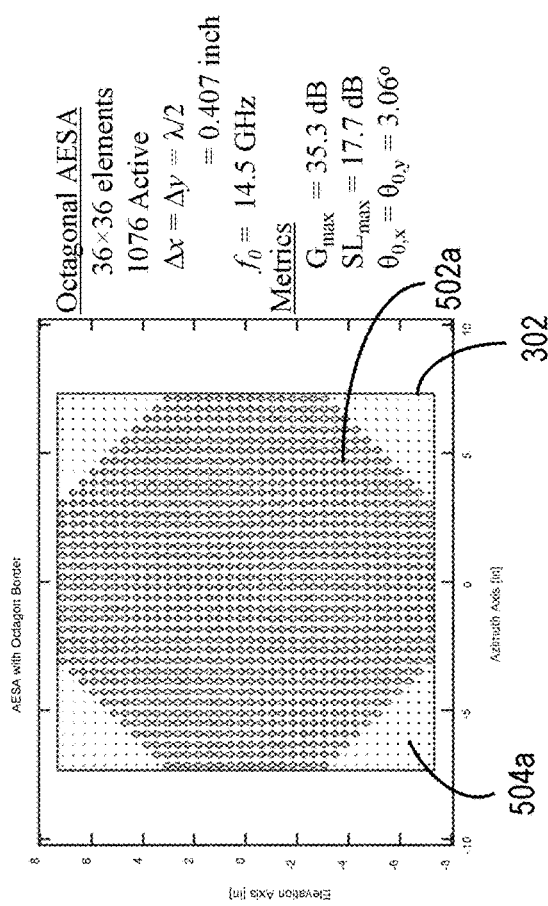
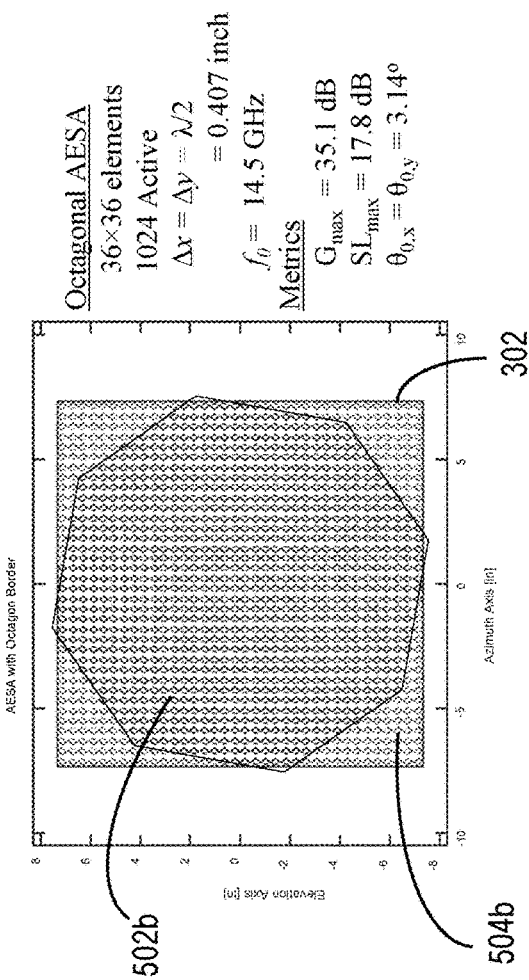
FIG. 5A
FIG. 5B

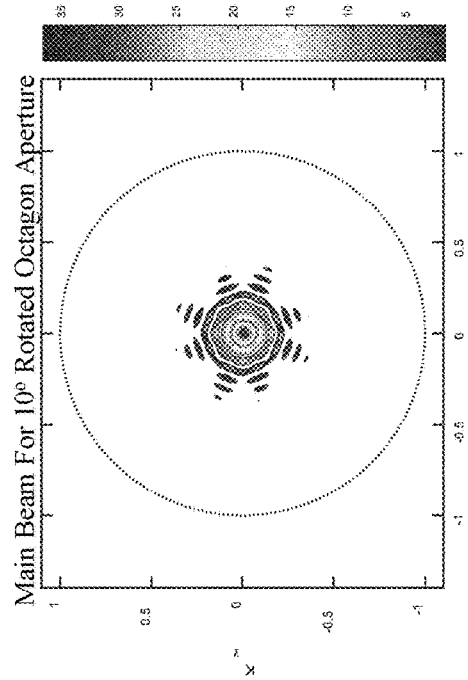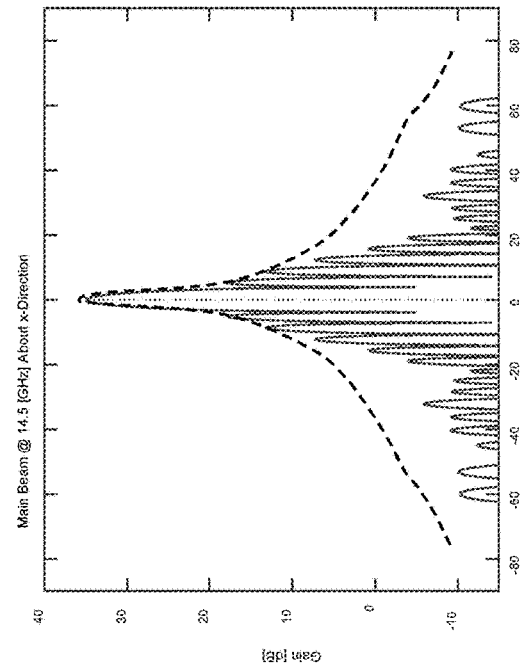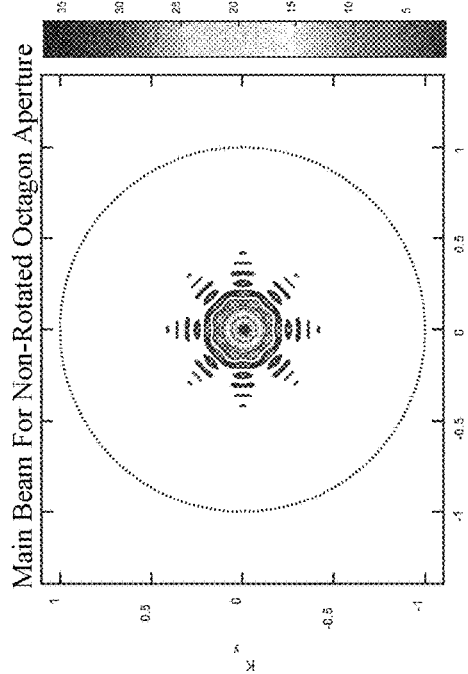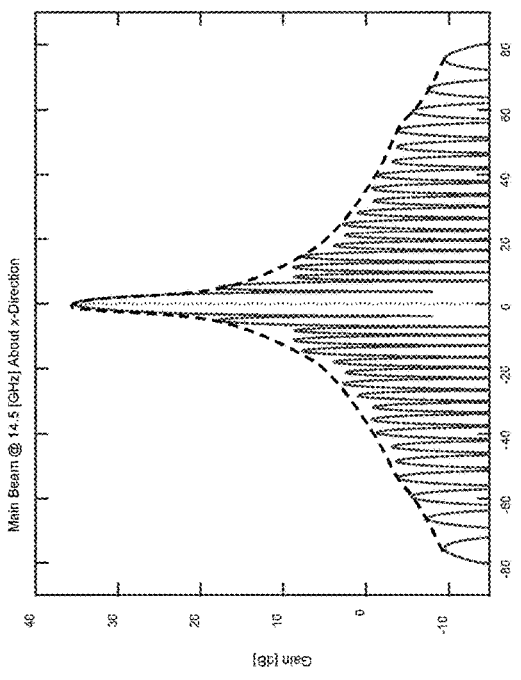

SYSTEMS AND METHODS FOR MITIGATING ADJACENT SATELLITE INTERFERENCE

CROSS-REFERENCE TO RELATED APPLICATIONS

The present application is a continuation under 35. U.S.C. § 120 of U.S. patent application Ser. No. 15/996,223 filed on Jun. 1, 2018, the content of which is hereby incorporated by reference.

BACKGROUND

Antenna arrays are commonly used in various communications systems as they can achieve higher gains, or narrower beams of radio waves, compared to for example omnidirectional antennas, and they can allow for beam steering. For instance, antenna arrays can be used in satellite communications, mobile communications, or radio communications between vehicles and ground stations. Antenna arrays can be mounted on aircrafts, rockets, drones, ships or marine vessels, ground vehicles, or other types of vehicles.

While antenna arrays are associated with narrower beams of radio waves than single antennas, antenna arrays can still cause (or suffer) signal interference due to gain or radiation power associated with, for example, sidelobes. Specifically, the power radiated by the antenna array off boresight can be high enough to cause signal interference at secondary communications devices the antenna array is not communicating with. Also, the gain of the antenna array off boresight can be high enough to cause signal interference at the antenna array due to secondary signals received from secondary communications devices the antenna array is not communicating with.

SUMMARY

In one aspect, the inventive concepts disclosed herein are directed to a method of mitigating adjacent satellite interference (ASI). The method can include determining a radiation pattern of an antenna array in communication with a first satellite. The method can include determining that a power level of the antenna array in a direction pointing to a second satellite exceeds a predefined threshold value, using the radiation pattern of the antenna array and a position of the second satellite. The method can include identifying one or more antenna elements among a plurality of antenna elements of the antenna array to be powered off. Powering off the one or more antenna elements causes a distortion of the radiation pattern of the antenna array in a way to reduce the power level of the antenna array in the direction pointing to the second satellite.

The method can include identifying the one or more antenna elements such that powered on antenna elements of the antenna array form a parallelogram shaped region. The distortion of the radiation pattern can include a rotation of one or more sidelobes of the radiation pattern relative to a main lobe of the antenna array.

The method can include identifying the one or more antenna elements such that powered on antenna elements of the antenna array form an octagon shaped region. The method can further include determining an orientation angle of the octagon shaped region relative to an axis of the antenna array. The distortion of the radiation pattern can include a reduction of a gain for a plurality of sidelobes of the radiation pattern relative to a gain of a main lobe of the antenna array.

The method can include identifying the one or more antenna elements such that powered on antenna elements of the antenna array form a hexagon shaped region. The method can include identifying the one or more antenna elements such that powered on antenna elements of the antenna array form a pentagon shaped region. The plurality of antenna elements of the antenna array can be equally weighted with respect to power amplification. The method can further include causing the one or more antenna elements to be turned off.

The method can include determining a position and an orientation of a vehicle on which the antenna array is mounted or integrated, and determining an orientation of the radiation pattern of the antenna array using the orientation of the vehicle. The method can include determining the power level of the antenna array in the direction pointing to the second satellite using the orientation of the radiation pattern, the position of the vehicle, and the position of the second satellite.

In a further aspect, the inventive concepts disclosed herein are directed to an electronic device for mitigating adjacent satellite interference (ASI). The electronic device can include one or more processors and a memory storing computer executable instructions. The computer executable instructions, when executed by the one or more processors, can cause the electronic device to determine a radiation pattern of an antenna array in communication with a first satellite. The electronic device can determine that a power level of the antenna array in a direction pointing to a second satellite exceeds a predefined threshold value, using the radiation pattern of the antenna array and a position of the second satellite. The electronic device can identify one or more antenna elements of a plurality of antenna elements of the antenna array to be powered off. Powering off the one or more antenna elements can cause a distortion of the radiation pattern of the antenna array in a way to reduce the power level of the antenna array in the direction pointing to the second satellite below the predefined threshold value.

The electronic device, upon execution of the computer executable instructions by the one or more processors, can identify the one or more antenna elements such that powered on antenna elements of the antenna array form a parallelogram shaped region. The electronic device, upon execution of the computer executable instructions by the one or more processors, can identify the one or more antenna elements such that powered on antenna elements of the antenna array form a pentagon shaped region or a hexagon shaped region.

The electronic device, upon execution of the computer executable instructions by the one or more processors, can identify the one or more antenna elements such that powered on antenna elements of the antenna array form an octagon shaped region. The electronic device can determine an orientation angle of the octagon shaped region relative to an axis of the antenna array. The plurality of antenna elements of the antenna array can be equally weighted with respect to power amplification.

The electronic device, upon execution of the computer executable instructions by the one or more processors, can determine a position and an orientation of a vehicle on which the antenna array is mounted or integrated. The electronic device can determine an orientation of the radiation pattern of the antenna array using the orientation of the vehicle. The electronic device can determine the power level of the antenna array in the direction pointing to the second satellite using the orientation of the radiation pattern, the position of the vehicle, and the position of the second satellite.

In a further aspect, the inventive concepts disclosed herein are directed to a method of mitigating adjacent satellite interference (ASI). The method can include determining a radiation pattern of an antenna array in communication with a first satellite. The method can include determining that a power level of the antenna array in a direction pointing to a second satellite exceeds a predefined threshold value, using the radiation pattern of the antenna array and a position of the second satellite. The method can include identifying a plurality of Taylor power amplification weights for applying to a plurality of antenna elements of the antenna array. The Taylor power amplification weights when applied to the plurality of antenna elements cause an asymmetric distortion of the radiation pattern of the antenna array in a way to reduce the power level of the antenna array in the direction pointing to the second satellite.

The method can include using a lookup table in identifying the plurality of Taylor power amplification weights.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 5A and 5B show example octagon shaped configurations of activated antenna elements of an antenna array, according to inventive concepts of the current disclosure;

FIGS. 6A-6D show simulation results for the octagon shaped configurations of FIGS. 5A and 5B, according to inventive concepts of the current disclosure.

Figure 1:
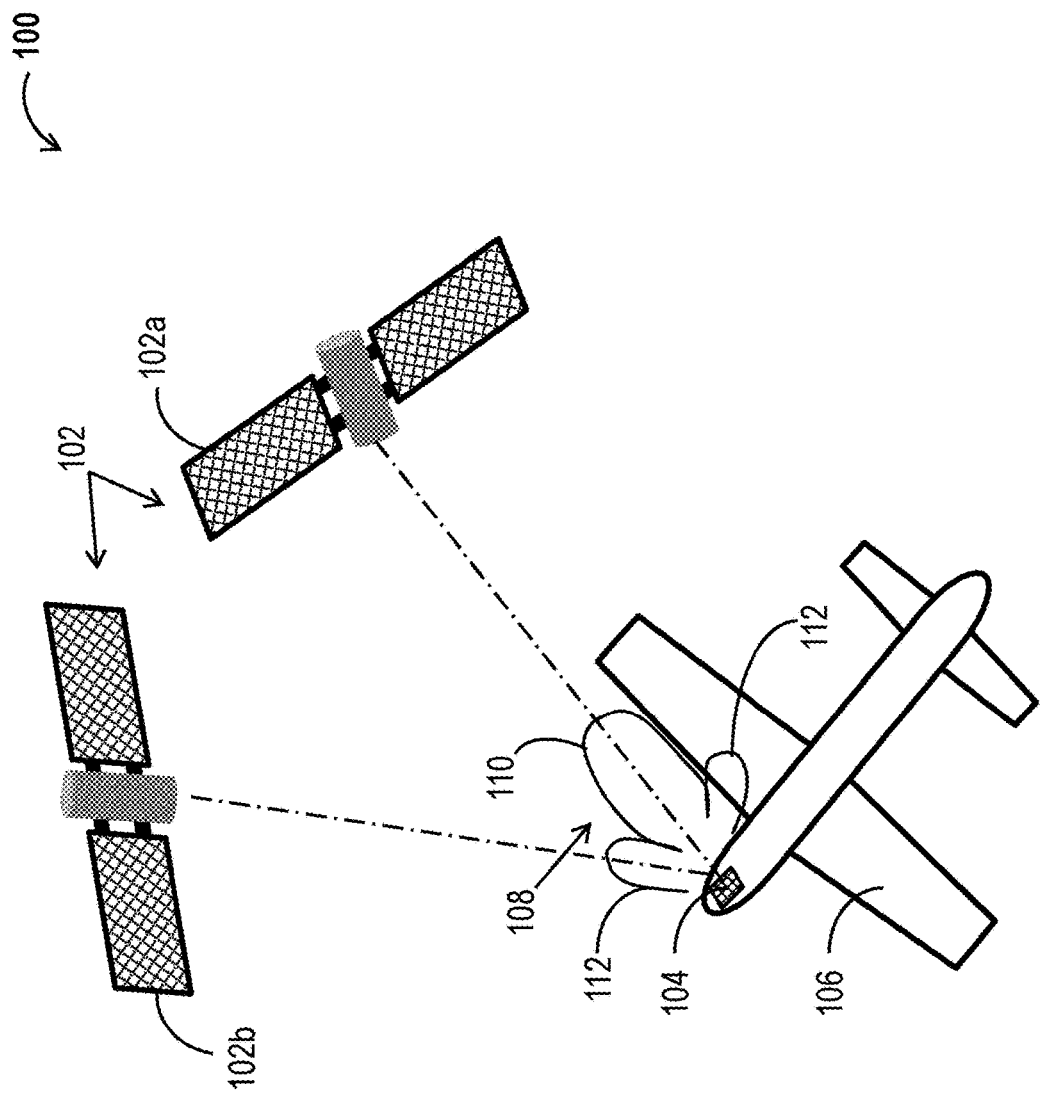
FIG. 1 shows a diagram illustrating an environment for satellite communications, according to inventive concepts of this disclosure.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

In satellite communications, there is a stringent regulation requirement on how much power an antenna communicating with a given satellite can transmit away from the antenna's main beam. For instance, when communicating with satellites that lie in an orbital plane, such as geosynchronous satellites distributed around the equator or LEO satellites that might be in polar orbits for example, the power radiated by the antenna off boresight is expected to fall below a mask predefined by existing regulations. However, for uniformly weighted square shaped, or rectangular shaped, antenna arrays the corresponding radiation patterns may not satisfy the regulation requirement for off boresight radiated power.

In a uniformly weighted antenna array, a fixed power amplification is uniformly applied to all the antenna elements of the antenna array. Uniform weighting, or uniform power amplification, across the antenna elements of an antenna array allows for low-cost active electronically scanned arrays (AESAs). Specifically, a non-uniformly weighted antenna array includes separately adjustable power amplifiers for distinct antenna elements instead of a single power amplifier for all antenna elements in a uniformly weighted antenna array or instead of individual power amplifiers for each element all operating at one power level. Also, AESA antennas have typically square shaped or rectangular shaped apertures. In a uniformly weighted antenna array (or AESA) having a square shaped aperture (region defined by activated antenna elements), the peak sidelobes' level can be about negative 13 decibels (dB) relative to the main lobe level. Such side lobe level (SLL) does not satisfy the regulation requirement for off boresight radiation power. In particular, when the peak side lobe points to another satellite different from (e.g., adjacent to) the satellite to which the antenna array is transmitting data, the power transmitted to the adjacent satellite exceeds the power level defined by the regulation requirement for off boresight radiated power, therefore, leading to adjacent satellite interference (ASI).

In the current disclosure, various techniques for avoiding or mitigating ASI are described. These techniques can involve distorting the shape of an aperture of a uniformly weighted antenna array by turning off or deactivating a subset of the corresponding antenna elements, or applying Taylor weighting for non-uniformly weighted antenna arrays. Furthermore, for non-uniformly weighted antenna arrays a combination of aperture distortion and Taylor weighting can be applied. While the aperture distortion or the Taylor weighting techniques are described herein mainly in the context of elimination or reducing ASI, the same techniques can be employed to eliminate or reduce signal interference in communications involving an antenna array. Also, these techniques can be employed in cases where the antenna array is transmitting or receiving.

The aperture distortion techniques or the Taylor weighting techniques described herein can be performed by one or more electronic devices such as a computing device (e.g., a desktop, a laptop, a computer server, a tablet, or a mobile device), a data processing system including one or more computing devices, a computer or electronic equipment of a structure hosting the antenna array (e.g., an aircraft, a rocket, a ground vehicle, or a fixed hosting structure), or one or more processors associated with, or communicatively coupled to, the antenna array. The one or more electronic devices can include a memory storing computer executable instructions and one or more processors for executing the computer executable instructions.

Referring now to the drawings, FIG. 1 shows a diagram illustrating a satellite communications environment 100, according to inventive concepts of this disclosure. The satellite communications environment 100 can include a plurality of satellites 102 and an antenna array 104 capable of communicating to the satellites 102. The antenna array 104 can be mounted on, or integrated in, an aircraft 106. The satellites 102 can include, for example, a satellite 102a and a satellite 102b. The antenna array 104 can have a radiation pattern 108 including a main lobe 110 and two or more sidelobes 112. In general, the radiation pattern 108 can define the gain of the antenna array in each direction. The antenna array 104 can be in communication with the satellite 102a with the main lobe 110 pointing towards the satellite 102a. For instance, the antenna array 104 can be transmitting data to the satellite 102a.

Depending on the position of the satellite 102b and the position and orientation of the aircraft 106 (or the antenna array 104), the antenna array 104 may unintentionally radiate (or transmit) power to the satellite 102b causing ASI while communicating with satellite 102a. For example, a side lobe 112 with corresponding SLL exceeding the power level defined by the regulation requirement for off boresight radiated power can be pointing towards the satellite 102b. In general, if the radiated power by the antenna array 104 in the direction pointing towards the satellite 102b exceeds the power level defined by the regulation requirement for off boresight radiated power, power radiation by the antenna array 104 can lead to signal interference at the satellite 102b. The power radiated by the antenna array 104 and received by the satellite 102b can interfere with other radio signals received by the satellite 102b from one or more transmitters with which the satellite 102b is communicating.

The antenna array 104 can be fixed at a specific location (or portion) of the airplane 106. The position and orientation of the antenna array 104 at any point of time can be defined by the position and orientation of the aircraft 106 at that point of time. The orientation of the aircraft 106 can depend on the yaw, pitch, and roll of the aircraft 106. A flight plan of the aircraft 106 can specify the aircraft's planned route or flight path and the position, yaw, pitch, and roll of the aircraft 106 at each point of flight path or at time instance throughout the flight. The position and orientation of the antenna array 104 throughout the flight can be known ahead of time (e.g., prior to start of flight) based on the flight plan.

While the satellite communications environment 100 is shown in FIG. 1 to include two satellites 102a and 102b, in general, the satellite communications environment 100 can include any number of satellites 102. Also, while communicating with one satellite 102, the antenna array 104 may cause ASI at more than one other satellite adjacent to the satellite with which the antenna array 104 is communicating. Also, while the antenna array 104 is shown to be mounted on an aircraft 106, in general, the antenna array can be mounted on a rocket, a fighter jet, a drone, a ground vehicle (e.g., car, truck, tank, etc.), a marine vessel, or other mobile or fixed structure.

Figure 2:
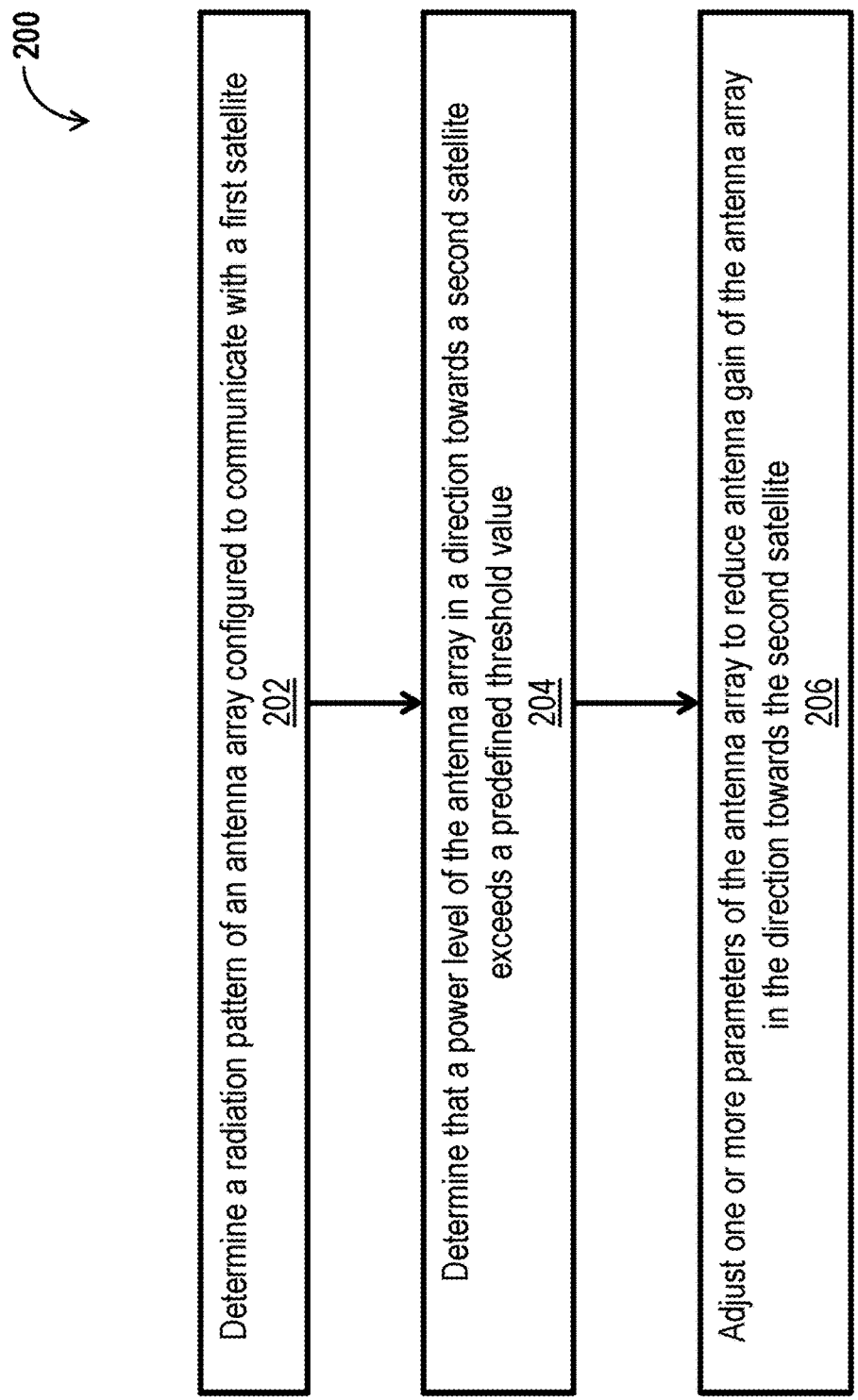
FIG. 2 shows a flow diagram illustrating a method of mitigating adjacent satellite interference (ASI), according to inventive concepts of this disclosure.

Referring to FIG. 2, a flow diagram illustrating a method 200 of mitigating adjacent satellite interference (ASI) is shown, according to inventive concepts of this disclosure. The method 200 can include determining a radiation pattern of an antenna array configured to communicate with a first satellite (ACT 202). The method 200 can include determining that a power level of the antenna array in a direction towards a second satellite exceeds a predefined threshold value (ACT 204). The method 200 can include adjusting one or more parameters of the antenna array to reduce antenna gain of the antenna array in the direction along the second satellite (ACT 206).

For an antenna array mounted on a flying object, such as antenna array 104 shown in FIG. 1, one or more computing devices can perform the steps of method 200 prior to launching or a takeoff of the flying object, or electronic equipment of the flying object can perform the steps of method 200 in real time while the object is flying. Similarly, for other structures hosting the antenna array, one or more electronic devices can perform the steps of the method 200 offline (e.g., prior to start of communication between the antenna array and the first satellite) or in real time while the antenna array is communicating with the first satellite. The method 200 can be implemented using software, firmware, hardware, or a combination thereof. For example, the method 200 can be implemented as computer code instructions that are executed by one or more processors of one or more electronic devices.

The method 200 can include one or more electronic devices determining a radiation pattern of an antenna array configured to communicate with a first satellite (ACT 202). The one or more electronic devices may determine the radiation pattern using the number of activated (also referred to as powered on or turned on) antenna elements of the antenna array, the positions of (or the spacings between) the activated antenna elements, the power amplification weight (or power excitation) of each of the activated antenna elements, and the time delay (or phase shift) associated with each of the activated antenna elements. For example, for a planar antenna array with N×M equally spaced antenna elements arranged as N antenna elements in each row and M antenna elements in each column, the radiation pattern in spherical coordinates can be described as:

$$F(\theta, \phi) = R(\theta, \phi) \cdot \sum_{n=1}^{N} \sum_{m=1}^{M} I_{n,m} e^{j(\delta_{n,m} + k \cdot d \cdot n \cdot \sin\theta \cdot \cos\phi + k \cdot d \cdot m \cdot \sin\theta \cdot \sin\phi)}, \quad (1)$$

where $I_{n,m}$ and $\delta_{n,m}$ represent the power amplification weight and the phase shift for the antenna element (n, m), respectively, d represents the distance between each pair of adjacent antenna elements, and k represents the wave number ( $$k = \frac{2\pi}{\lambda}$$

where $\lambda$ is the wavelength). The function $R(\theta,\phi)$ represents the radiation pattern of each antenna element of the antenna array. For a uniformly weighted antenna array, the power amplification weights $I_{n,m}$ can be replaced by a constant value I (or 1). The angle $\theta$ represents the pointing direction angle away from boresight, and the angle φ represents the azimuth of the pointing direction.

In determining the radiation pattern, the one or more electronic devices may evaluate the function F(θ,φ) for all possible values of θ and φ, or for specific values of these angles (e.g., values corresponding to directions pointing towards one or more satellites). The one or more electronic devices may compute the values of the function F(θ,φ) or use a lookup table to determine the radiation pattern of the antenna array. The lookup table may include values of the function F(θ,φ) at sampled values of θ, φ, $I_{n,m}$, $\delta_{n,m}$ or a combination thereof. Determining the radiation pattern may include determining the angles between the axis of the main lobe and one or more axes of one or more side lobes.

The antenna array can be configured (or arranged) to communicate with the first satellite, such as satellite 102a shown in FIG. 1, at a given time instance or while located at a given geographical position. For instance, for an antenna array mounted on a vehicle, the antenna array may communicate with different satellites at distinct time instances throughout the navigation path of the vehicle. For example, an antenna array mounted on an aircraft (or other flying object) may communicate with one satellite during one segment of the flight path and communicated with another satellite during another segment of the flight path. The antenna array may switch, in terms of satellite communications, from one satellite to another, for example, based on the locations of various satellites over time, the position and orientation of the antenna array over time, the communications capabilities of the antenna array or a transmitting device associated with the antenna array, or a combination thereof.

The method 200 can include the one or more electronic devices determining that a power level of the antenna array in a direction towards a second satellite exceeds a predefined threshold value (ACT 204). If the antenna array is mounted on a vehicle (e.g., aircraft, rocket, ground vehicle, a marine vessel, etc.), the one or more electronic devices can determine the position and an orientation of the vehicle on which the antenna array is mounted or integrated. For example, for an aircraft, the one or more electronic devices can determine the corresponding position, yaw, pitch, and roll. The one or more electronic devices can receive flight plan information of the aircraft (or other flying object) as input, and use the received information to determine the position and orientation parameters of the aircraft at a given point of time or at given point of the flight path. The one or more electronic devices can receive the position and orientation of the vehicle on which the antenna array is mounted from sensors integrated in the vehicle in real time while the vehicle is moving. The sensors can include a global positioning system (GPS) device, a gyroscope sensor (e.g., laser gyroscope or fiber-optic gyroscope), an accelerometer, or a combination thereof.

The one or more electronic devices can determine the position and orientation of the antenna array using the position and orientation information of the hosting vehicle. The one or more electronic devices can determine an orientation of the radiation pattern based on the orientation of the antenna array. For instance, for a planar antenna array, the one or more electronic devices can determine the orientation of the aperture plane (or the plane common to the antenna elements) using the orientation of the vehicle and the position and orientation of the antenna array relative to the vehicle. Determining the orientation of the radiation pattern can include determining the direction of the axis of the main lobe and/or the direction(s) of one or more side-lobes' axes. When the antenna array is communicating with the first satellite, the main lobe, or the corresponding axis, would be pointing towards the first satellite.

The one or more electronic devices can determine the position of one or more other satellites. The one or more electronic devices can receive positioning information of the one or more other satellites, for example, using corresponding ephemeris data. Satellite orbits are determined by their ephemeris data, a set of parameters that defines their Keplerian orbits at a particular time. The ephemerides of a satellite system can be provided by the satellite operator(s). Given the position of the antenna array, the radiation pattern and the corresponding orientation, and the positioning information of the one or more other satellites, the one or more electronic devices can determine the power level (or antenna gain) of the antenna array towards each of the one or more other satellites. For example, for each other satellite (e.g., other than and adjacent to the first satellite with which the antenna array is configured to communicate), the one or more electronic devices can determine an angle between the axis of the main lobe of the antenna array (or a line connecting the antenna array with the first satellite) and a line connecting the antenna array with the other satellite. The one or more electronic devices can determine the antenna gain or the radiation power (e.g., in decibel milliwatts per 40 kHz bandwidth) in the direction of the other satellite using the angle between the axis of the main lobe and the line connecting the antenna array with the other satellite. If the antenna gain is determined, the one or more electronic devices can determine the transmitted power of the antenna array using the determined antenna gain in the direction of the other satellite and the input power of the antenna array.

The one or more electronic devices can compare radiation power in the direction of each of the other satellites to a predefined power threshold value. The power threshold value can be defined by a regulation of the satellite communications. For instance, the regulation can specify a maximum of allowed off boresight radiation power to avoid or mitigate ASI. The one or more electronic devices can determine that the radiation power in the direction of a second satellite (among the one or more other satellites) exceeds the power threshold value. For instance, as illustrated in FIG. 1, a peak side lobe 112 with a SLL greater than the power threshold value can be pointing to the second satellite 102b with which the antenna array 104 is not communicating. The power radiated towards the second satellite 102b can cause ASI. Specifically, the power radiated towards the second satellite 102b can cause signal interference at the second satellite 102b.

The method 200 can include the one or more electronic devices adjusting one or more parameters of the antenna array to reduce antenna gain (or radiated power) of the antenna array in the direction along (or towards) the second satellite (ACT 206). Specifically, the one or more electronic devices can modify the one or more parameters to distort the radiation pattern of the antenna array in a way to reduce the radiated power at least in the direction of the second satellite. The one or more electronic devices may determine one or more antenna elements of the antenna array to be deactivated (or powered off) to distort the aperture of the antenna array, and therefore, distort the radiation pattern. In the case where the antenna array allows for non-uniform power amplification weighting, the one or more electronic device may adjust the power amplification weights associated with distinct antenna elements of the antenna array. The antenna array may include power amplifiers associated with distinct antenna elements allowing for non-uniform power amplification weighting.

Figure 3:
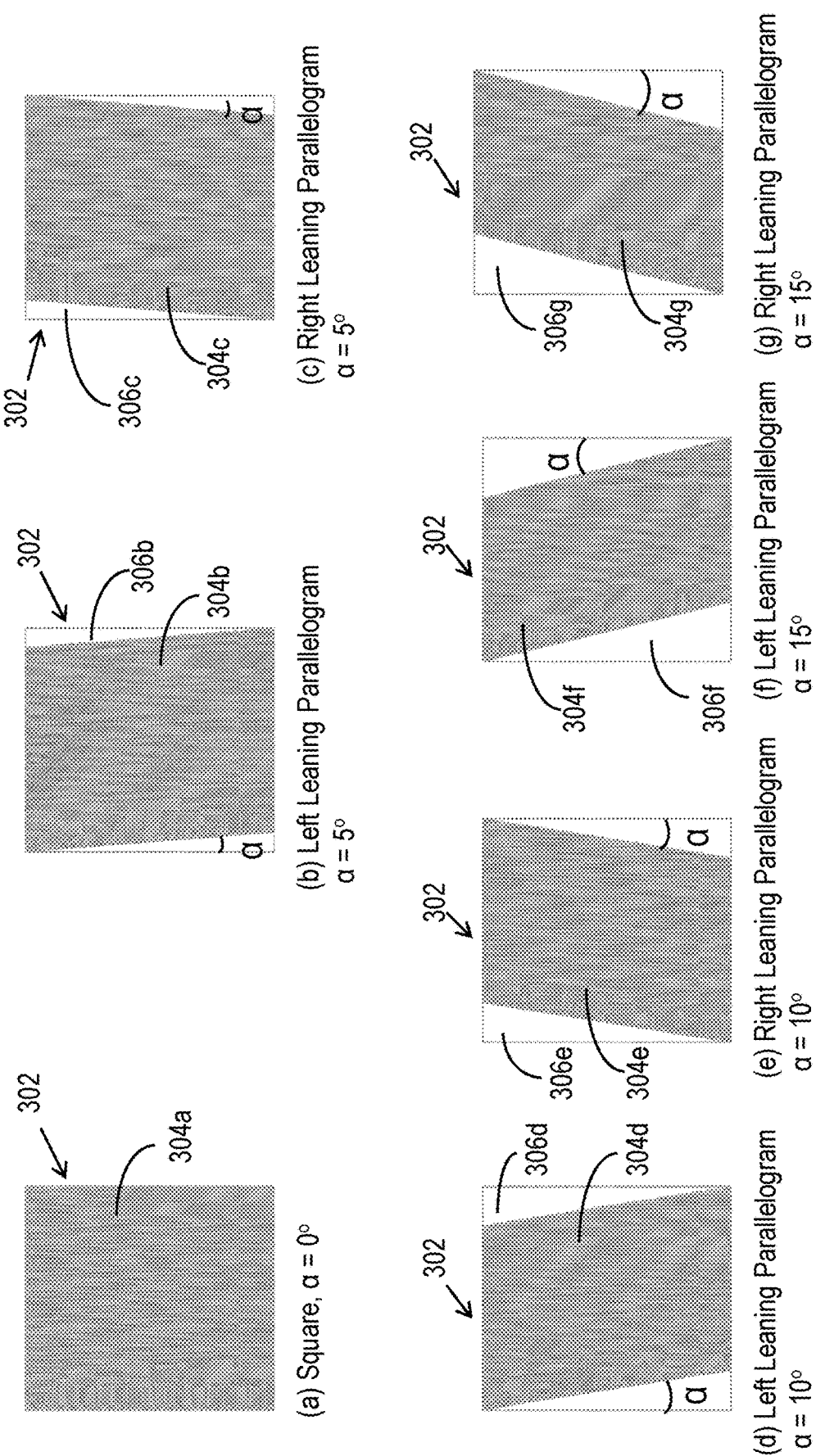
FIG. 3 shows a square aperture of an antenna array and corresponding examples of parallelogram shaped distortions achieved by deactivated subsets of antenna elements of the antenna array, according to inventive concepts of the current disclosure.

Referring to FIG. 3, example distortions of a square aperture of an antenna array 302 into parallelogram shaped regions of activated antenna elements are shown, according to inventive concepts of the current disclosure. The gray region depicted in FIG. 3(a) shows a square antenna array aperture (or a square shaped region of activated antenna elements) 304a. The antenna array 302 can include, for example, 36×36 antenna elements. The diagrams (b) through (k) of FIG. 3 show various parallelogram shaped distortions of the aperture in diagram (a) of FIG. 3. Specifically, the gray regions in the diagrams (b) through (k) of FIG. 3 show the regions of activated antenna elements 304b-304k, respectively, while the white regions in the antenna array 302 depict the regions of deactivated (or powered off) antenna elements 306b-306k. The one or more electronic devices can deactivate the antenna elements within any of the regions 306b to 306k to obtain the corresponding parallelogram shaped aperture 304b to 304k, respectively.

The apertures 304b-304k in the diagrams (b)-(k) of FIG. 3 have parallelogram shaped regions leaning (or oriented) left or right at different angles $\alpha$. For example, the parallelograms representing the apertures 304b and 304c in the diagrams (b) and (c) are leaning left and right, respectively, at $\alpha=5°$. Also, the parallelograms representing the apertures 304d and 304e in the diagrams (d) and (e) are leaning left and right, respectively, at $\alpha=10°$. In the diagrams (f) and (g), the parallelograms representing the apertures 304f and are leaning left and right, respectively, at $\alpha=15°$. The parallelograms representing the apertures 304h and 304i in the diagrams (h) and (i) of FIG. 3 are leaning left and right, respectively, at $\alpha=20°$. Finally, the parallelograms representing the apertures 304j and 304k in the diagrams (j) and (k) are leaning left and right, respectively, at $\alpha=25°$.

Figure 4A:
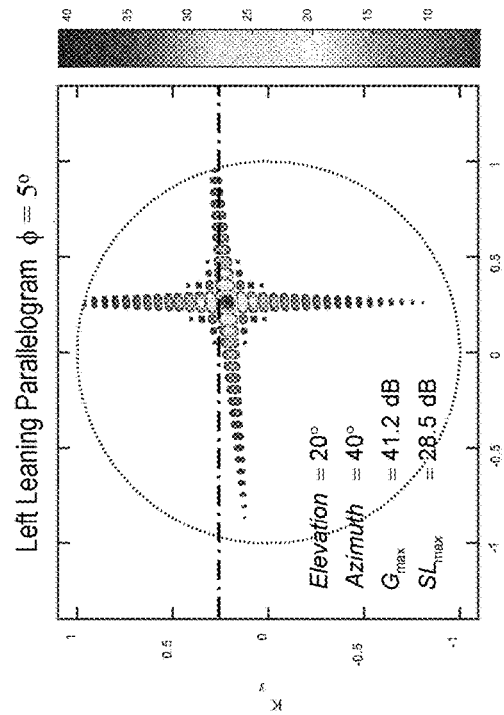
FIGS. 4A-4K show simulation results of the radiation patterns of the apertures depicted in FIG. 3, according to inventive concepts of the current disclosure.
Figure 4B:
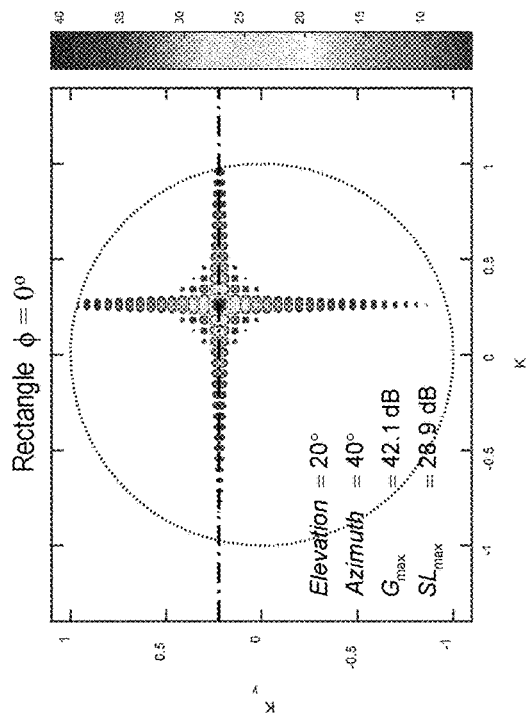
Figure 4C:
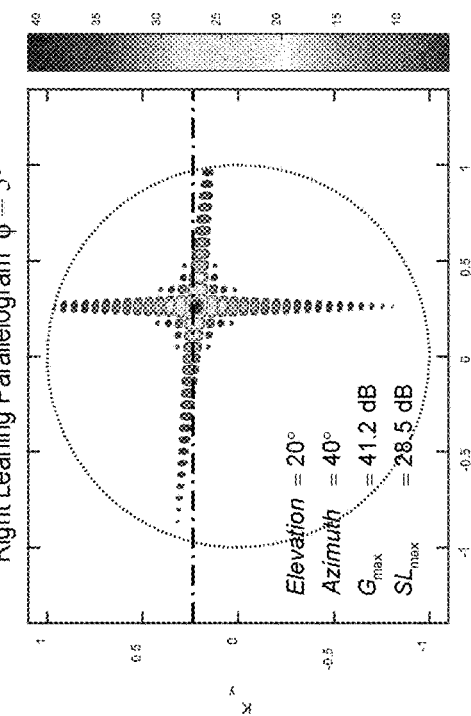
Figure 4E:
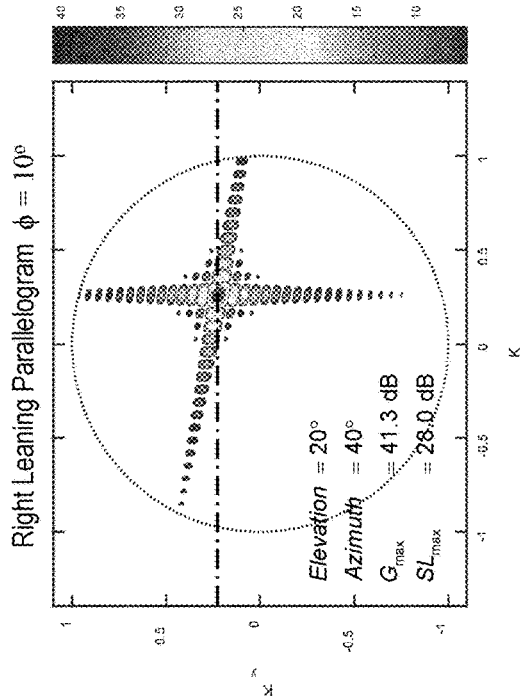
Figure 4G:
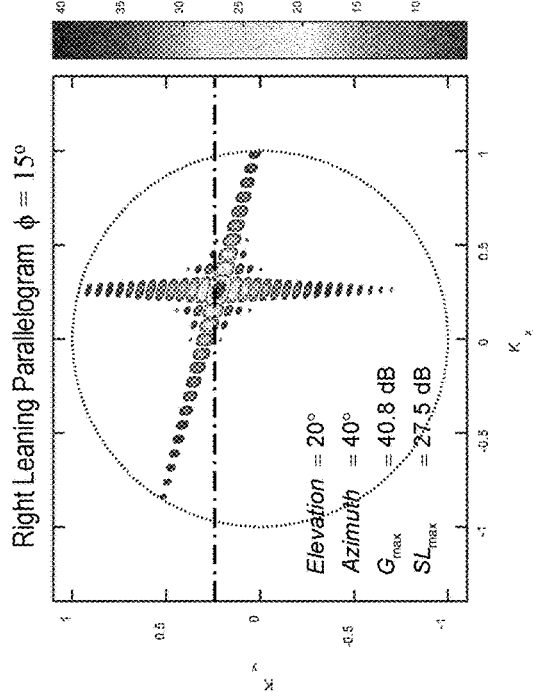
Figure 4D:
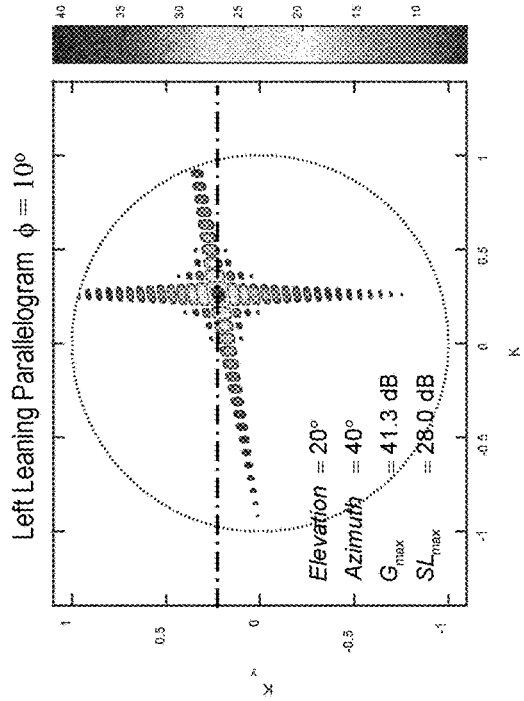
Figure 4F:
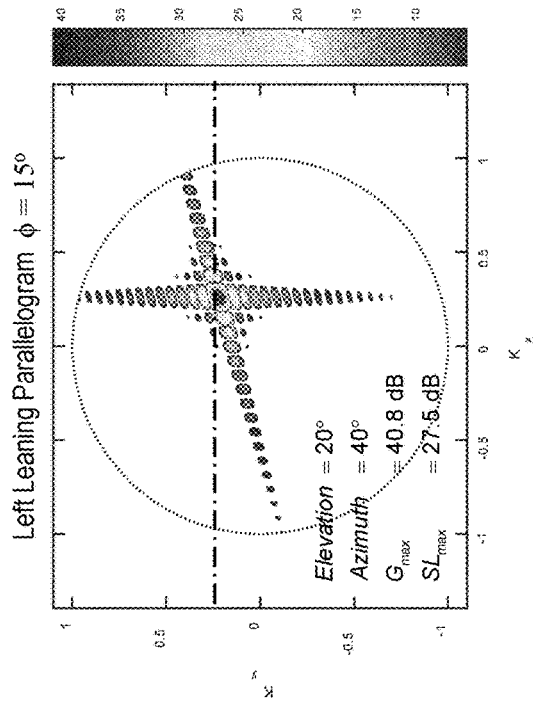
Figure 4H:
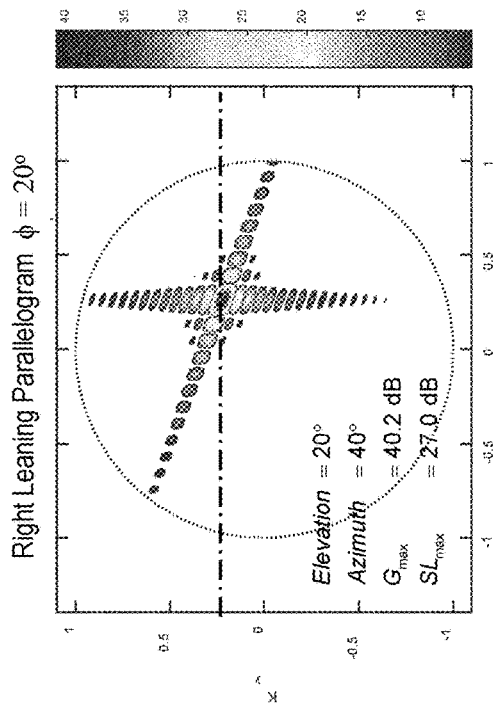
Figure 4I:
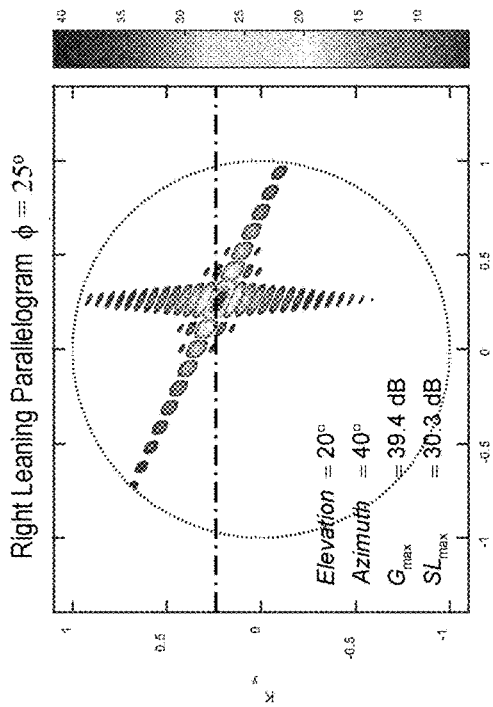
Figure 4J:
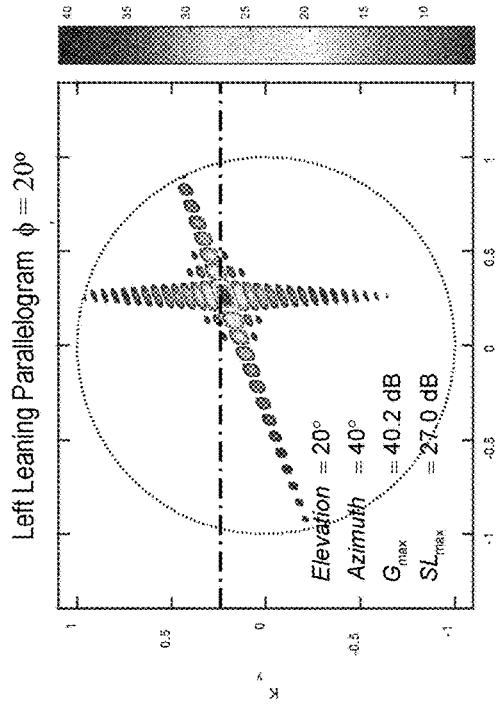
Figure 4K:
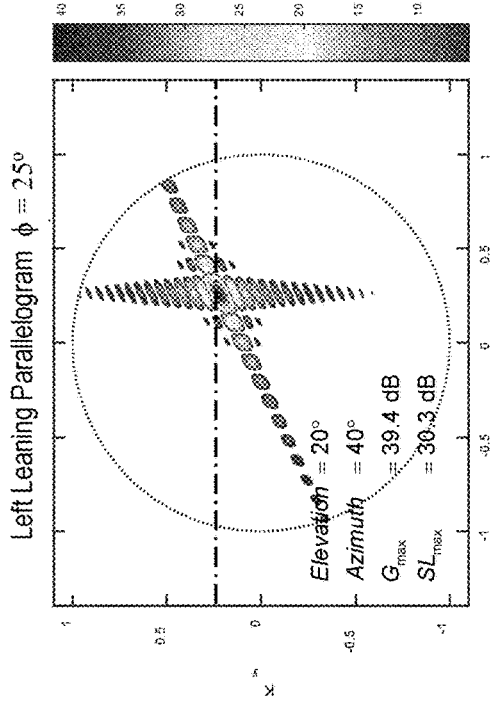

Referring to FIGS. 4A-4K, simulation results of the radiation patterns of the apertures depicted in FIG. 3 are shown, according to inventive concepts of the current disclosure. Specifically, the radiation patterns shown in FIGS. 4A-4K correspond, respectively, to the apertures 304a-306k shown in the diagrams (a)-(k) of FIG. 3. Comparing the radiation patterns in FIGS. 4B and 4C to the radiation pattern in FIG. 4A, one can see that the positions of the sidelobes running along (or aligned parallel to) the $K_x$ axis in FIGS. 4B and 4C are tilted (or rotated) at the main lobe and away from the break line along which the corresponding sidelobes in the radiation pattern of FIG. 4A are aligned. Specifically, the axis along which the sidelobes running along the $K_x$ axis are aligned rotates away from the break line in FIGS. 4B and 4C compared to FIG. 4A. The rotations of such axis (and the tilt in the positions of the sidelobes aligned along this axis) are in different directions in FIGS. 4B and 4C. In other words, an aperture having a shape of a left leaning parallelogram (e.g., aperture 304b) causes a rotation of the axis along which the horizontal sidelobes are aligned that is in the opposite direction compared to the rotation caused by a right leaning parallelogram (e.g., aperture 304b).

Comparing the radiation patterns in FIGS. 4D, 4F, 4H and 4J (left leaning parallelograms) to the radiation pattern in FIG. 4B, and comparing the radiation patterns in FIGS. 4E, 4G, 4I and 4K (right leaning parallelograms) to the radiation pattern in FIG. 4C, one can see that the rotation of the axis along which the sidelobes running along the $K_x$ axis are aligned increases as the angle $\alpha$ of the corresponding parallelograms increases, for example, from 5° to 25°. The increase in the angle $\alpha$ also leads to a decrease in the maximum gain (gain along the axis of the main lobe) $G_{max}$ because the increase in the angle $\alpha$ results in a decrease in the total number of activated antenna elements. For instance, as a increases from 0° to 25°, $G_{max}$ decreases from 42.1 dB to 39.4 dB. The one or more electronic devices may make up for the decrease in $G_{max}$, for example, by causing the input power of the antenna array 302 to be increased.

The rotation of the axis along which the sidelobes running along the $K_x$ axis are aligned means a displacement of the sidelobes running along the $K_x$ axis. In other words, deactivating (or powering off) antenna elements to distort the aperture from a square shaped to a parallelogram shaped causes displacement of at least one subset of sidelobes (e.g., those running along the $K_x$ axis). To cause displacement of the sidelobes running along the $K_y$ axis, the one or more electronic devices can deactivate antenna elements in a way to transform the aperture into one having an upper leaning parallelogram shape or a down leaning parallelogram shape.

The one or more electronic devices can select a parallelogram shaped aperture from a plurality of parallelogram shaped apertures based on, for example, the corresponding radiation patterns and the locations of the satellites adjacent to the first satellite with which the antenna array is configured (or arranged) to communicate. For example, the one or more electronic devices can determine, for each parallelogram shaped aperture of a plurality of parallelogram shaped apertures, the corresponding radiation pattern, and check whether the radiated power towards adjacent satellites exceeds the predefined power threshold value. The one or more electronic devices can compute the radiation patterns for distinct parallelogram shaped apertures or use one or more lookup tables to determine the radiation patterns. The one or more electronic devices can select a parallelogram shaped aperture that does not cause ASI (e.g., none of the corresponding radiated powers towards the adjacent satellites exceeds the power threshold value). Once a parallelogram shaped aperture is selected, the one or more electronic devices can identify a subset of antenna elements of the antenna array (e.g., those corresponding to one of the regions 306b-206k in FIG. 3) to be deactivated (or powered off) in order to achieve the selected parallelogram shaped aperture.

Referring to FIGS. 5A and 5B, example octagon shaped apertures (or configurations of activated antenna elements of the square shaped antenna array 302 of FIG. 3 are shown, according to inventive concepts of the current disclosure. The antenna array 302 is the same square shaped antenna array as that in FIG. 3 with 36×36 antenna elements and equal spacing of $\lambda/2=0.407$ inch between centerlines of adjacent antenna elements, where $\lambda$ is the smallest wavelength supported by the antenna array 302. The angles $\theta_{x,0}$ and $\theta_{y,0}$ represent the angles for full width, half maximum (FWHM) beamwidth of the main lobe in the x and y directions, respectively. In FIG. 5A, the octagon shaped aperture 502a represents the region of activated (or powered on) antenna elements and includes 1076 active antenna elements. The regions 504a within antenna array 302 represent the regions of deactivated (or powered off) antenna elements.

In FIG. 5B, the octagon shaped aperture 502b represents the region of activated (or powered on) antenna elements and includes 1012 active antenna elements. The octagon shaped aperture 502b can be viewed, approximately, as a rotated version (e.g., rotated by 10° clockwise around the center of the antenna array 302) of the octagon shaped aperture 502a. The regions 504b within the antenna array 302 represent the regions of deactivated (or powered off) antenna elements.

FIGS. 6A-6D show simulation results for the octagon shaped apertures of FIGS. 5A and 5B, according to inventive concepts of the current disclosure. Specifically, FIGS. 6B and 6C show the main beams (or radiation patterns in the $K_x$-$K_y$ plane) for the apertures 502a and 502b, respectively. FIGS. 6C and 6D show plots of the main beams of FIGS. 6B and 6C, respectively, in the x-direction. The maximum gain $G_{max}$ for the octagon shaped aperture 502a is 35.3 dB and that of the rotated octagon shaped aperture 502b is 35.1 dB. The maximum gain for both octagon shaped apertures 502a and 502b is smaller than the maximum gain for the square shaped aperture 304a. The decrease in maximum gain for the octagon shaped apertures, compared to the square shaped aperture 302 is due to the smaller number of activated elements in the octagon shaped apertures 502a and 502b (compared to the total number of activated antenna elements in the square shaped aperture 304a).

The maximum SLL for the octagon shaped aperture 502a is 17.7 dB and that of the rotated octagon shaped aperture 502b is also 17.8 dB. However, the maximum SLL for the square shaped aperture 304a is 28.9 dB. Comparing the shapes of the radiations patterns of the octagon shaped apertures 502a and 502b shown in FIGS. 6A and 4A to the shape of radiation pattern of the square shaped aperture 304a shown in FIG. 4A, one can see that the sidelobes of the octagon shaped apertures 502a and 502b are distributed along eight different angles instead of four angles for the sidelobes of the square shaped aperture 304a. The increase in the angles along which the sidelobes are distributed for the octagon shaped apertures 502a and 502b leads to reduced levels of peak sidelobes (or maximum SLLs) compared to the square shaped aperture 304a. Also, for the square shaped aperture 304a, the difference between the maximum gain at the main lobe and the maximum SLL (gain at the peak side lobe) is 13.2 dB, whereas the difference between the maximum gain and the maximum SLL for the octagon shaped aperture 502a is 17.6 dB and the difference between the maximum gain and the maximum SLL for the octagon shaped aperture 502b is 17.3 dB. Therefore, deactivating (or turning off) the antenna elements in the regions 504a or 504b to achieve the octagon shaped aperture 502 or 502b can cause a greater drop in gain or power level between the main lobe and the peak side lobe, and a reduction in the SLLs.

Comparing the octagon shaped apertures 502a and 502b and the corresponding simulations results in FIGS. 6A-6D, the octagon shaped aperture 502b can be viewed as a rotated version of the octagon shaped aperture 502a. Also, the radiation pattern of the octagon shaped aperture 502b in FIG. 6B can be viewed as a rotated version of the radiation pattern the octagon shaped aperture 502a shown in FIG. 6A. For instance, comparing the plots in FIGS. 6C and 6D depicting the gains of the apertures 502a and 502b, respectively, along the x-direction, the SLLs of the aperture 502b along the x-direction are smaller than those of the aperture 502a. The dashed line in both FIGS. 6C and 6D represent the envelope for the plot in FIG. 6C. As illustrated in FIG. 6D, most sidelobes of the aperture 502b in the x-direction are way below the envelope for the plot in FIG. 6C.

The one or more electronic devices can use rotated versions of the octagon shaped aperture 502a to further reduce radiated power level in a given direction (e.g., towards a satellite adjacent to the first satellite with which the antenna array is arranged to communicate), for example, to eliminate or mitigate ASI. For instance the one or more electronic devices may determine (e.g., compute or use a lookup table) the radiation patterns for various rotated versions (e.g., with different rotation angles) of the octagon shaped aperture 502a, and check whether any of the octagon shaped apertures causes ASI at any of the adjacent satellites. The one or more electronic devices can check, for each of the octagon shaped apertures, the levels of radiated power in the directions pointing to adjacent satellites. The one or more electronic devices can select an octagon shaped aperture that does not cause ASI, and identify the antenna elements to be turned off (or deactivated) based on the selected octagon shaped aperture.

The one or more processors can use other shapes (e.g., pentagon, hexagon, other polygon shapes, or a circle) for the distorted aperture. In general, the more edges the shape has or the closer it approximates a circle, the higher is the difference between the corresponding maximum gain and the corresponding maximum SLL. Based on the simulation results in FIGS. 5A-5B and 6A-6D, the difference between the maximum gain at the main lobe and the maximum SLL (gain at the peak sidelobe) is 17.6 dB and 17.3 dB for the octagon shaped apertures 502a and 502b, respectively. For a uniformly weighted circular aperture, the difference between the maximum gain at the main lobe and the maximum SLL is 17.8 dB. The one or more electronic devices may determine the radiation patterns for various rotated versions of a pentagon rotated aperture, and select a version that does not cause ASI. Similarly, the one or more electronic devices may determine the radiation patterns for various rotated versions of a hexagon rotated aperture, and select a version that does not cause ASI. The one or more processors can identify the subset of antenna elements to be deactivated (or powered off) based on the selected aperture shape and rotation (or orientation).

If the antenna array includes separate amplitude (or power) amplifiers for separate antenna elements, then it can support non-uniform power amplification weighting. In such case, the one or more electronic devices can cause asymmetric distortion of the antenna array aperture (e.g., aperture with all the antenna elements activated) by applying Taylor weights derived based on an asymmetric Taylor pattern as discussed in R. S. Elliott, "Design of Line Source Antennas for Narrow Beamwidth and Asymmetric Low Sidelobes," IEEE Transactions on Antennas and Propagation, Vol. 23, pp 100-107, January 1975 (hereinafter "Elliott"). Specifically, assuming that the antenna array has a width equal to 2a (e.g., in the x-direction), the Taylor weights for each antenna array having x-coordinate equal to x ($-a \le x \le a$) can be determined as:

$$f(x) = \begin{cases} \dfrac{1}{2\pi} \sum_{m=-n_L+1}^{n_R-1} F(m) e^{-im\frac{\pi x}{a}}, & |x| \le a \\ 0, & |x| \ge a \end{cases} \quad (2)$$

The function F(m) represents the asymmetric Taylor pattern and can be defined as:

$$F(m) = \frac{\sin m\pi}{m\pi} \prod_{n=1}^{n_R-1} \left\{ 1 - \frac{m}{\sigma_R \left[ A_R^2 + \left(n - \frac{1}{2}\right)^2 \right]^{1/2}} \right\}. \quad (3)$$

$$\prod_{n=1}^{n_L-1}\left\{1+\frac{m}{L\left[A_L^2+\left(n-\frac{1}{2}\right)^2\right]^{1/2}}\right\}.$$

$$\left[\prod_{n=1}^{n_R-1}\left(1-\frac{m}{n}\right)\cdot\prod_{n=1}^{n_L-1}\left(1+\frac{m}{n}\right)\right]^{-1},$$

where the subscripts R and L refer, respectively, to the right (0≤x≤a) and left (−a≤x≤0) sides of the antenna array, and the parameters $n_R$, $n_L$, $A_R$, $A_L$, $\sigma_R$, and $\sigma_L$ can be defined as described in Elliot and T. T. Taylor, "Design of Line-Source Antennas for Narrow Beamwidth and Low Sidelobes," IEEE Transactions on Antennas and Propagation, Vol. 23, pp 100-107, January 1975 (hereinafter "Taylor"). Specifically, Table II of Taylor provides the values for these parameters according to the design sidelobe ratio (in dB). For example, for a left sidelobe ratio equal to 15 dB and a right sidelobe ratio equal to 40 dB, the values $n_R$=8, $n_L$=3, $A_R^2$=2.84428, $A_L^2$=0.589550, $\sigma_R$=1.04068, and $\sigma_L$=1.114712 can be used. The Taylor weights according to equation (2) can be complex numbers. Accordingly, the antenna array can use the amplitudes of the Taylor weights as power (or amplitude) amplification weights for the corresponding antenna elements, and the respective phases as phase shifts to the corresponding antenna elements.

Figure 7:
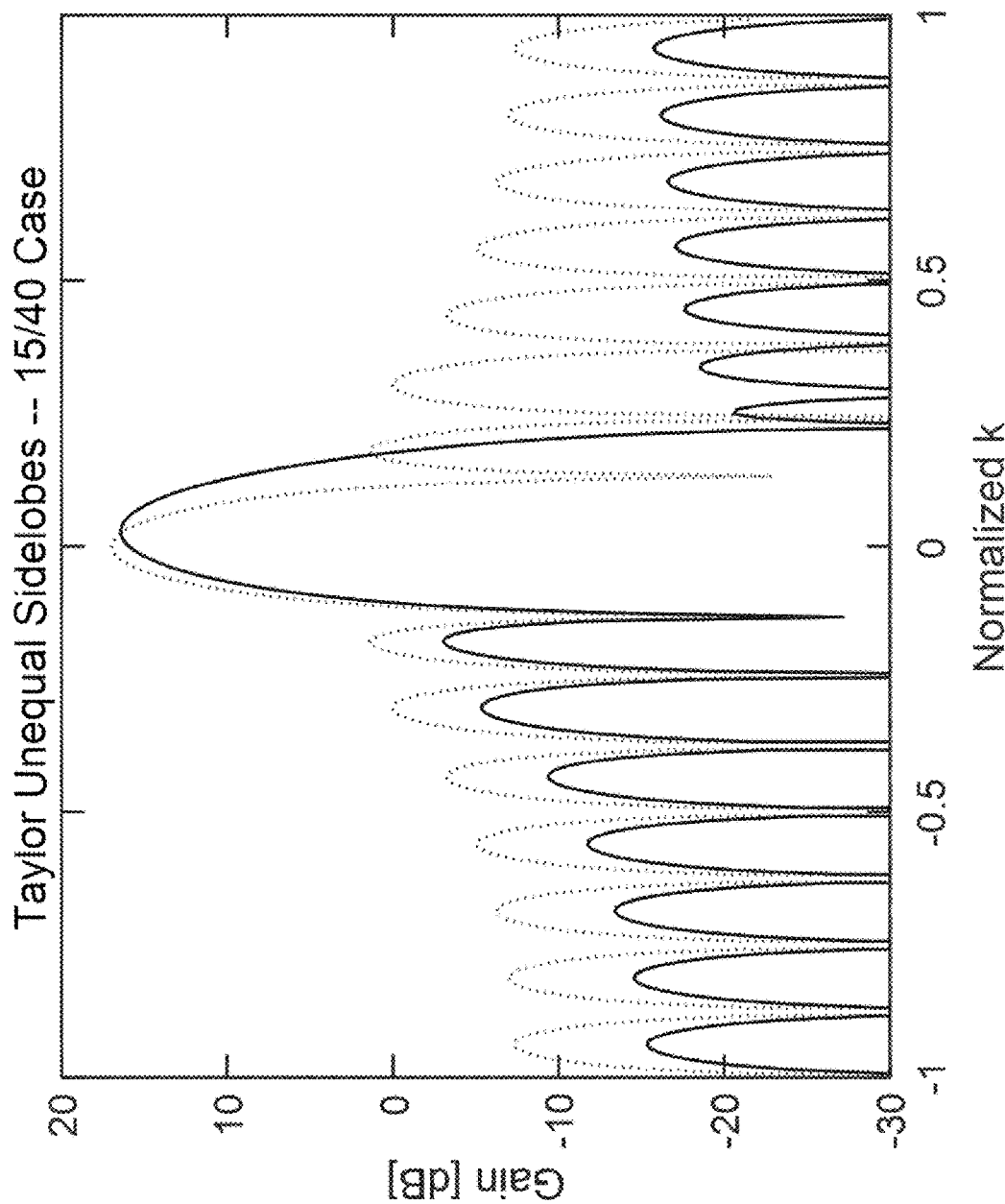
FIG. 7 shows plots of the radiation pattern along for uniform weighted and non-uniform weighted antenna elements of a one-dimensional antenna array, according to inventive concepts of the current disclosure.

Referring to FIG. 7, plots of the radiation pattern along for uniform weighted and non-uniform weighted antenna elements of a one-dimensional (1-D) antenna array are shown, according to inventive concepts of the current disclosure. The one dimensional array include 16 antenna elements. The plot in dashed line represents the gain of the 1-D antenna array with uniform weights across all the antenna elements. The plot in continuous line represents the gain of the 1-D antenna array with non-uniform weights defined by the function ƒ(x) for a left sidelobe ratio equal to 15 dB and a right sidelobe ratio equal to 40 dB. For the non-uniform weighting scenario, the left right sidelobes have lower (or smaller) levels compared to corresponding left sidelobes.

For the uniformly weighted scenario, the maximum gain is $G_{max}$=17.0 dB, and the maximum side lobe level is $SLL_{max}$=1.4 dB. For the non-uniformly weighted scenario, the maximum gain is $G_{max}$=16.4 dB, the maximum left side lobe level is $SLL_{max,L}$=−3.0 dB, $SLL_{max,R}$=−15.8 dB. As such, the achieved left sidelobe ratio is 16.4−(−3.0)=19.4 dB (>15 dB), and the achieved right sidelobe ratio is 16.4−(−15.8)=32.2 dB (<40 dB). That is, the achieved left and right sidelobe ratios are different than the design sidelobe ratios. Accordingly, the one or more electronic devices (or one or more other computing devices) may determine the sidelobe ratios for different scenarios of non-uniform weighting (e.g., different sets of non-uniform weights) and record the sets of weights and the corresponding sidelobe ratios, for example, in a lookup table. The one or more electronic devices can use the lookup table to determine the set of weights to be used to asymmetrically distort the aperture of the antenna array.

While the plots in FIG. 7 are generated using a 1-D antenna array, the non-uniform weighting describe above can be applied to a two-dimensional (2-D) antenna array, such as antenna array 302 in FIG. 3. The non-uniform weights can vary either along the x-direction or along the y-direction. The one or more electronic devices can use a lookup table including, for example, sets of weights and corresponding sidelobe ratios to determine a set of weights to be used to asymmetrically distort the aperture of the antenna array 302 and avoid or mitigate ASI. The one or more electronic devices may use asymmetric distortion through non-uniform weights in cases where the distribution of adjacent satellites is asymmetric with respect to the location of the first satellite with which the antenna array is communicating or configured to communicate. For example, if the adjacent satellites happen to be on one side relative to the main lobe, the one or more electronic devices may employ non-uniform weighting to reduce SLL on that side.

Referring back to FIG. 2, the one or more electronic devices can perform method 200 for a plurality of points along a navigation path (or for a plurality of time instances within a travel time duration) of a vehicle hosting the antenna array. The primary satellite with which the antenna array communicates may change from one point to another and so may change the corresponding adjacent satellites. The one or more electronic devices can perform method 200 in real time as the vehicle is moving and the position and orientation of the antenna array is changing, or offline before the start of the vehicle navigation (e.g., based on information or parameters of a flight plan).

Embodiments described herein allow for avoiding or mitigating ASI by powering off (or deactivating) a subset of the antenna elements of the antenna array, applying Taylor non-uniform weighting to achieve asymmetric distortion of the radiation pattern of the antenna array, or a combination thereof. While the embodiments described herein are discussed in the context of ASI, these embodiments can be employed to avoid or mitigate signal interference at the antenna array. Specifically, when the antenna array is receiving signals from a primary source, the radiation pattern (or gain) distortion techniques described herein (e.g., modifying the shape of the aperture by deactivating a subset of the antenna elements or applying non-uniform weighting) can be used to reduce the power of secondary signals received from the secondary sources, and therefore, reduce signal interference at the antenna array.

The construction and arrangement of the systems and methods are described herein as illustrative examples and are not to be construed as limiting. Although only a few embodiments have been described in detail in this disclosure, many modifications are possible (e.g., variations in sizes, dimensions, structures, shapes and proportions of the various elements, values of parameters, mounting arrangements, use of materials, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method of operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A method of mitigating adjacent satellite interference (ASI), the method comprising:
    determining a first radiation pattern of an active electronically scanned array (AESA) antenna on a vehicle and in communication with a first satellite, the AESA antenna including a plurality of antenna elements with a first subset of the plurality of antenna elements, associated with a first region of an array of the AESA antenna, activated to generate the first radiation pattern;

determining that a power level of the AESA antenna in a direction pointing to a second satellite exceeds a predefined threshold value, using the first radiation pattern of the AESA antenna and a position of the second satellite;

selecting, responsive to determining that the power level of the AESA antenna in the direction pointing to the second satellite exceeds a predefined threshold value, from a plurality of predefined regions of the array of the AESA antenna, a second region of the array of the AESA antenna defining a second subset of the plurality of antenna elements based on a second radiation pattern associated with the second region of the array of the AESA antenna, each of the plurality of predefined regions defining a respective subset of the plurality of antenna elements; and causing the second subset of the plurality of antenna elements to be activated instead of the first subset, the second subset different from the first subset and activation of the second subset instead of the first subset reducing the power level of the AESA antenna in the direction pointing to the second satellite below the predefined threshold value.

2. The method of claim 1, further comprising identifying the second subset of the plurality of antenna elements based on the second region of the array of the AESA antenna.

3. The method of claim 1, wherein selecting the second region of the array of the AESA antenna includes selecting the second region of the array of the AESA antenna further based on a respective shape or orientation.

4. The method of claim 1, wherein selecting the second region of the array of the AESA antenna includes using a lookup table.

5. The method of claim 1, wherein a first shape of the first region of the array of the AESA antenna is different from a second shape of the second region of the array of the AESA antenna.

6. The method of claim 5, wherein the first shape is a square and the second shape is a parallelogram.

7. The method of claim 1, wherein the first region of the array of the AESA antenna and the second region of the array of the AESA antenna have a common shape but different orientations.

8. The method of claim 7, wherein the common shape includes a pentagon, a hexagon or an octagon.

9. The method of claim 1, wherein activation of the second subset instead of the first subset causes gain reduction for a plurality of sidelobes relative to a gain of a main lobe of the AESA antenna.

10. The method of claim 1, comprising:
determining a position and an orientation of the vehicle;
determining an orientation of the radiation pattern of the AESA antenna using the orientation of the vehicle; and
determining the power level of the AESA antenna in the direction pointing to the second satellite using the orientation of the radiation pattern, the position of the vehicle, and the position of the second satellite.

11. An electronic device for mitigating adjacent satellite interference (ASI), comprising:
one or more processors; and
a memory storing computer executable instructions, the computer executable instructions, when executed by the one or more processors, cause the electronic device to:
determine a first radiation pattern of an active electronically scanned array (AESA) antenna in communication with a first satellite, the AESA antenna including a plurality of antenna elements with a first subset of the plurality of antenna elements, associated with a first region of an array of the AESA antenna, activated to generate the first radiation pattern;
determine that a power level of the AESA antenna in a direction pointing to a second satellite exceeds a predefined threshold value, using the radiation pattern of the AESA antenna and a position of the second satellite;
select, responsive to determining that the power level of the AESA antenna in the direction pointing to the second satellite exceeds a predefined threshold value, from a plurality of predefined regions of the array of the AESA antenna, a second region of the array of the AESA antenna defining a second subset of the plurality of antenna elements based on a second radiation pattern associated with the second region of the array of the AESA antenna, each of the plurality of predefined regions defining a respective subset of the plurality of antenna elements; and
cause the second subset of the plurality of antenna element to be activated instead of the first subset, the second subset different from the first subset and activation of the second subset instead of the first subset reducing the power level of the AESA antenna in the direction pointing to the second satellite below the predefined threshold value.

12. The electronic device of claim 11, wherein the computer executable instructions, when executed by the one or more processors, further cause the electronic device to identify the second subset of the plurality of antenna elements based on the second region of the array of the AESA antenna.

13. The electronic device of claim 11, wherein in selecting the second region of the array of the AESA antenna, the computer executable instructions, when executed by the one or more processors, cause the electronic device to select the second region of the array of the AESA antenna further based on a respective shape or orientation.

14. The electronic device of claim 11, wherein in selecting the second region of the array of the AESA antenna, the electronic device uses a lookup table.

15. The electronic device of claim 11, wherein a first shape of the first region of the array of the AESA antenna is different from a second shape of the second region of the array of the AESA antenna.

16. The electronic device of claim 15, wherein the first shape is a square and the second shape is a parallelogram.

17. The electronic device of claim 11, wherein the first region of the array of the AESA antenna and the second region of the array of the AESA antenna have a common shape but different orientations.

18. The electronic device of claim 17, wherein the common shape includes a pentagon, a hexagon or an octagon.

19. The electronic device of claim 11, wherein activation of the second subset instead of the first subset causes gain reduction for a plurality of sidelobes relative to a gain of a main lobe of the AESA antenna.

20. The electronic device of claim 11, wherein the computer executable instructions, when executed by the one or more processors, further cause the electronic device to:
determine a position and an orientation of the vehicle;
determine an orientation of the radiation pattern of the AESA antenna using the orientation of the vehicle; and
determine the power level of the AESA antenna in the direction pointing to the second satellite using the orientation of the radiation pattern, the position of the vehicle, and the position of the second satellite.

\* \* \* \* \*